Figures 1, 2:
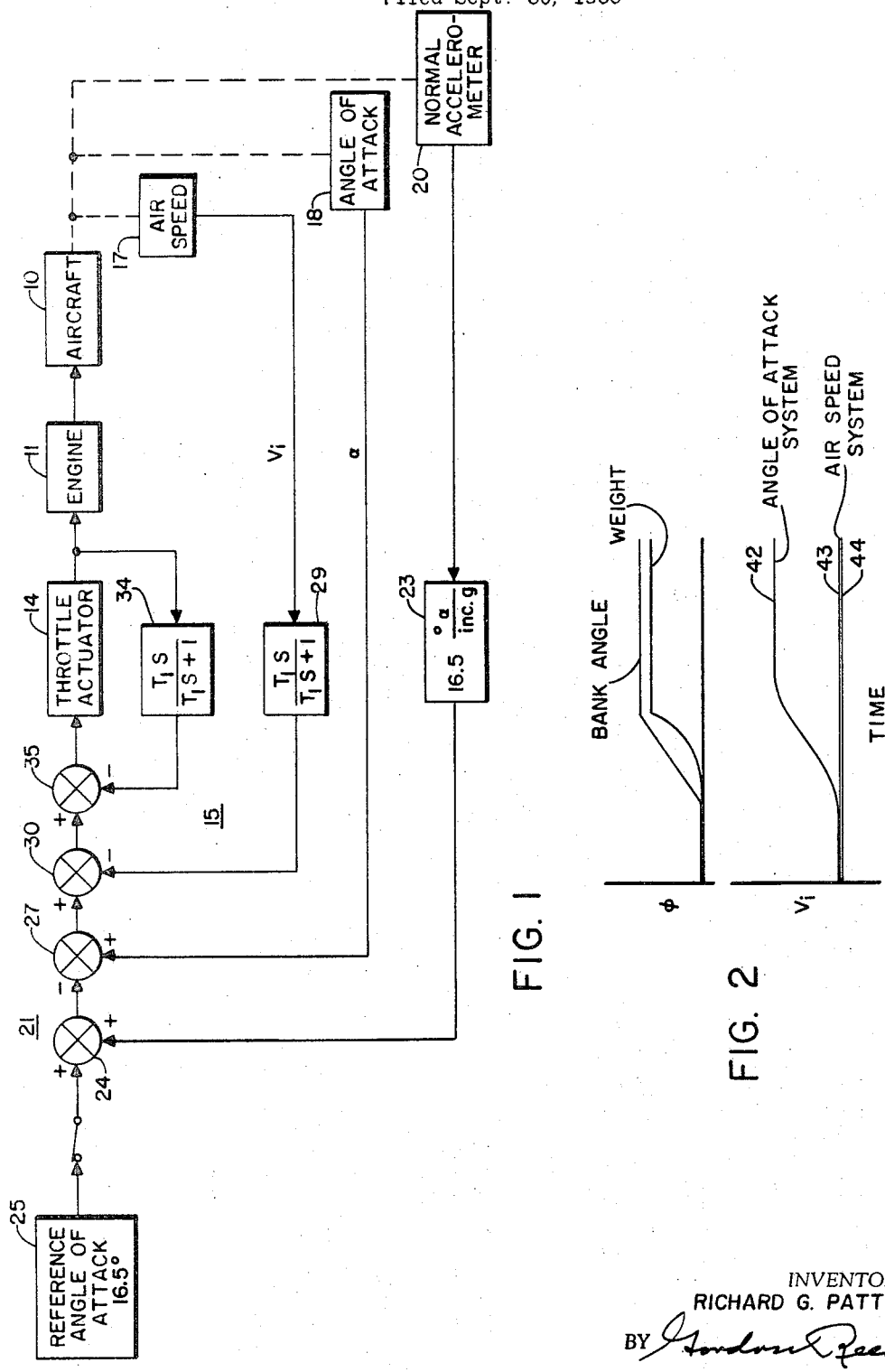

INVENTOR.
RICHARD G. PATTERSON
BY *Gordon Reed*
ATTORNEY great # United States Patent Office 3,379,396
Patented Apr. 23, 1968

3,379,396
CONTROL APPARATUS
Richard G. Patterson, St. Louis Park, Hennepin, Minn., assignor to Honeywell Inc., Minneapolis, Minn., a corporation of Delaware
Filed Sept. 30, 1966, Ser. No. 583,210
6 Claims. (Cl. 244—77)

This invention relates to aircraft control apparatus and is especially concerned with apparatus for automatically controlling the propulsion engines of an aircraft to cause the craft to fly substantially at a selected-parameter such as a predetermined angle of attack. In the flight performance of modern aircraft, with the aircraft at a given weight or loading, there may be selected an angle of attack of the aircraft that has a desired lift coefficient of such magnitude that it will give a desired stall margin for the aircraft in flight. Consequently, for a given weight and a selected lift coefficient, the air speed of the aircraft to maintain level or non-normal acceleration perpendicular to the roll and pitch axes is thereby determined. This is evident from the expression lift=weight=$\frac{1}{2}\rho V^2 C_1 A$, wherein W=the gross weight of the aircraft, $\rho$=air density, V=true air speed, $C_1$=coefficient of lift, A=the wing area of the aircraft.

Automatic throttle control apparatus for an aircraft wherein the position of the throttle of the aircraft engine or the power output of the engine depends upon the departures of the changes in angle of attack of the aircraft from a selected angle of attack have been provided heretofore. Thus, for level flight or under conditions in which the aircraft has no acceleration normal to the pitch and roll axes of the craft, the angle of attack may be held to a selected magnitude by altering the position of the throttle of the engine of the aircraft upon momentary changes in angle of attack. If the angle of attack increases, the power developed by the engine will increase to increase its forward speed thereby decreasing the angle of attack to the reference angle of attack magnitude.

Thereby control of the proper angle of attack was automatically effected in prior art devices by means of engine power variation. This leaves the aircraft flight control surface operation to the autopilot or the pilot of the aircraft for controlling the aircraft flight path without being concerned with angle of attack.

During operation of the flight control surfaces of the aircraft causing a banked turn attitude of the craft, the total lift vector of the aircraft should be increased in order to maintain altitude or zero vertical acceleration flight of the aircraft. When the pilot operates the aircraft control surfaces to place the aircraft in a banked turn, he may also operate the elevator surface to increase the angle of attack of the aircraft to increase the total lift vector.

In an angle of attack power control system, such increase in angle of attack is detected by the angle of attack sensor and the sensor would normally call for increase in power from the engine to decrease the angle of attack by increasing the air speed.

The present invention is concerned with providing an improved angle of attack power control system for an aircraft wherein changes of normal acceleration, as that caused by banking of an aircraft in a turn and increase in angle of attack is not reflected in changes in position of the power control actuator.

A further object of this invention is to provide an accelerometer in an angle of attack power control system, responsive to normal acceleration in the direction of the plane of the roll and lateral axis of an aircraft, to in effect change the angle of attack reference at which the aircraft is to fly.

A further object of this invention is to provide an improvement in automatic power control systems for an aircraft for maintaining a selected angle of attack, involving means for permitting change in the angle of attack to be maintained during normal acceleration without changing the power developed by the engine (except for the change associated with any change in drag).

A further object of this invention is to provide an improved power control system for maintaining a selected angle of attack, involving means for preventing change in the power control member during banked turns of the aircraft, except for the change associated with a change in drag.

The above and still other objects of the invention will be evident upon review of the following description thereof taken in conjunction with the accompanying drawings.

In the drawing, FIGURE 1 is a block diagram of the novel automatic power control apparatus of an aircraft for maintaining a selected angle of attack;

FIGURE 2 is a diagram showing the comparison of the present arrangement with two types of prior automatic power control apparatus.

Referring to FIGURE 1, an aircraft 10 which has conventional flight control surfaces (not shown) which may be operated by an autopilot or by manual pilot thereof includes a propulsion engine 11. The power developed by the engine 11 may be controlled, for example, by the adjustment of a conventional throttle. The throttle for the engine is controlled by a throttle actuator 14 of an automatic throttle control system 15.

The automatic throttle control system 15 includes an air speed sensor 17 which develops a signal in accordance with the air speed of the aircraft; an angle of attack sensor 18 sensing the angle of attack of the aircraft; and an accelerometer 20 sensing the acceleration of the craft along an axis perpendicular to the plane of the longitudinal and lateral axes of the craft. A summing arrangement 21 is provided for the signals supplied to the throttle actuator 14. A signal from the normal accelerometer 20 is supplied through a gain device 23 to a summing device 24. A second input to summing device 24 is obtained from a reference angle of attack selector 25. The function of the gain device 23 is to convert the normal accelerometer signal into an equivalent angle of attack signal to in effect increase the angle of attack reference for increase in normal acceleration.

The angle of attack sensed by sensor 18 is supplied to a second summing device 27 which receives a second input from the output of summing device 24.

The air speed signal from sensor 17 is supplied through a hi-pass network 29 having the transfer function shown in the drawing to a third summing device 30 which has as a second input the output from summing device 27.

The displacement of throttle actuator 14 is supplied in feedback relation through a hi-pass network 34 to a fourth summing device 35 having as a second input thereto the output from summing device 30. The output from summing device 35 is supplied to the throttle actuator 14 for control thereof.

While not shown specifically, it is evident that the signals from sensors 17, 18, and 20 may be of the electrical type as would also be the selected angle of attack reference signal from selector 25. Networks 29 and 34 would be suitable shaping networks for the signals which may be of the DC type and summing devices 24, 27, 30, and 35 would be selected to suitably sum such signals. The signal phasing is as in FIGURE 1.

A novel feature of the automatic throttle control system above is effected through the loop comprising the normal acceleration sensor 20, whereby the angle of attack reference selected is additionally biased to in effect increase the angle of attack to be maintained as during banked turns of the craft when the pilot of the craft, while in such bank angle, operates the elevator surface to increase the angle of attack to prevent loss of altitude of the craft in such banked turn. Such increase in angle of attack increases the craft normal acceleration.

FIGURE 2 brings out the advantage of this novel feature. In FIGURE 2, there is an upper graph of both bank angle, $\phi$, and apparent weight and a lower graph of craft air speed, $V_i$, both graphs having time as abscissae. The upper graph shows how the apparent weight of the aircraft increases in time as the bank angle increases in a turn until desired bank is reached. At the desired or maximum bank angle, the apparent weight magnitude levels off. The increase in weight is an increase in normal acceleration.

The lower graph shows three curves 42, 43, and 44, also plotted against time. Curve 42 may be termed an angle of attack power control system where an angle of attack is maintained but air speed is varied during a banked attitude to increase the total lift vector of the craft to compensate for the increasee in apparent weight and prevent loss of altitude in a turn. Curve 43 is a constant air speed automatic throttle control system wherein the angle of attack of the aircraft is varied while in a banked turn while holding the selected air speed, to prevent loss of altitude of the craft in a banked turn. The applicant's arrangement operates as in curve 44 and while it is basically an angle of attack control system, it functions in a banked turn as an air speed automatic throttle control system and thus does not permit the increase in air speed as does the conventional angle of attack system. This result is obtained by means of the loop containing the accelerometer 20 whereby the selected referenced angle of attack is increased to compensate for the increased angle of attack given the aircraft by operation of the flight control surfaces thereof.

An illustration of the advantage of applicant's arrangement involves the flight of the aircraft while following a conventional glide path beam during automatic approach. If the craft be following the glide path beam at a constant rate of descent at which time it is not undergoing any normal acceleration other than one G, and should the aircraft be displaced laterally from the glide path beam, the pilot may operate the flight control surfaces of the aircraft to initiate an S turn maneuver to attain the beam. During the placing of the aircraft in the bank turn, the pilot also applies up elevator to increase the craft angle of attack to hold altitude rate. The increase in angle of attack consequently affecting sensor 18 is compensated by the increased bias of angle of attack applied by the loop containing sensor 20. Thereby, no adjustment in the position of the throttle actuator 14 occurs and no increase in air speed except for transient corrections through sensor 17 results.

Summarizing, at initiation of the automatic throttle control, the output of the angle of attack sensor 18 is compared with the selected angle of attack reference (16.5°), for example. The resultant error signal is applied to the throttle actuator 14 to position the throttle to accelerate the vehicle to the referenced angle of attack value. The air speed sensed by the sensor 17 is hi-passed and thus augments the throttle command to provide damping of the air speed response. The phasing of the angle of attack error signal is such as to provide a throttle increase due to angle of attack increases resulting, for example, from vertical gust disturbances to increase air speed. Consequently, a deficiency in angle of attack at engagement will call for initial decrease in throttle to decrease air speed.

During specified constant altitude maneuvers requiring banking of the aircraft, while maintaining constant air speed, the pilot (or autopilot) will introduce an "up-elevator" signal into the pitch channel to increase lift sufficiently to overcome the loss in lift due to rotation of the lift vector of the craft. The resulting increase in angle of attack during such standard turn maneuver requires compensation of the reference angle of attack from device 25 to avoid automatic throttle action tending to oppose the pilot input which action would be evidenced by constantly increasing air speed to reduce the angle of attack. Such compensation is effected as stated through the control loop comprising accelerometer 20 and gain device 23 for biasing the selected angle of attack reference.

While a preferred embodiment of my invention has been described, it is to be understood that the description is not to be taken as a limitation of the invention but that changes within the scope of the appended claims may be made without departing from the spirit of my invention in its broader aspects.

I claim:
1. In power control apparatus for a propulsion engine of an aircraft, said aircraft having first means operating flight control surfaces thereof to increase normal acceleration of the craft, said apparatus including a sensor responsive to angle of attack changes; a sensor responsive to air speed changes; a reference selector for one of said first two sensors; and a normal accelerometer sensing changes in the normal acceleration of the craft resulting, for example, from operation of said first means; in combination: means for converting the sensed change in normal acceleration to an equivalent magnitude of a quantity of the type affecting said reference selector; and further means responsive to the first two sensors, said reference selector and to the converting means to provide an air speed error signal for controlling the power of said engine.

2. The apparatus of claim 1, an engine throttle actuator, and responsive means operating said throttle actuator in accordance with the magnitude of said air speed error signal.

3. The apparatus of claim 1, wherein change in normal acceleration is obtained by operation of the first means to bank said aircraft.

4. The apparatus of claim 2, including feedback means for transmitting the displacement of the throttle actuator to the responsive means that control the throttle actuator.

5. The apparatus of claim 4, wherein the throttle actuator position is fed back to the responsive means through a hi-pass network.

6. The apparatus of claim 5 wherein the air speed of the craft is fed back to the responsive means through a hi-pass network corresponding to a similar network in the throttle actuator position feedback.

References Cited
UNITED STATES PATENTS 2,948,496  8/1960  Joline _____ 244—77
3,128,967  4/1964  Hays _____ 244—77

FERGUS S. MIDDLETON, *Primary Examiner.*